Figure 1:
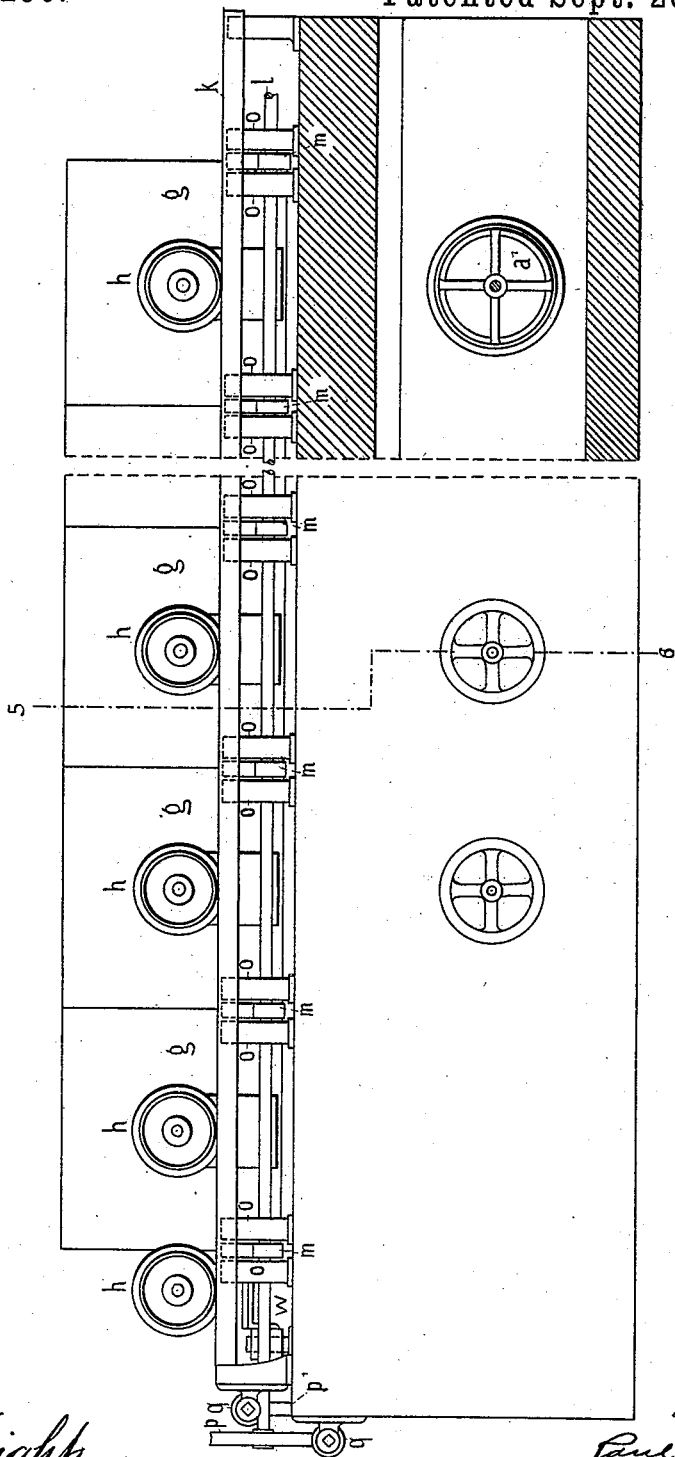

(No Model.) 3 Sheets—Sheet 1.
P. WEINIG.
MALT GERMINATING APPARATUS.

No. 370,296. Patented Sept. 20, 1887.

Attest.
H. S. Knight.
Emma Arthur.

Inventor
Paul Weinig
By Knight & Co.
Attys

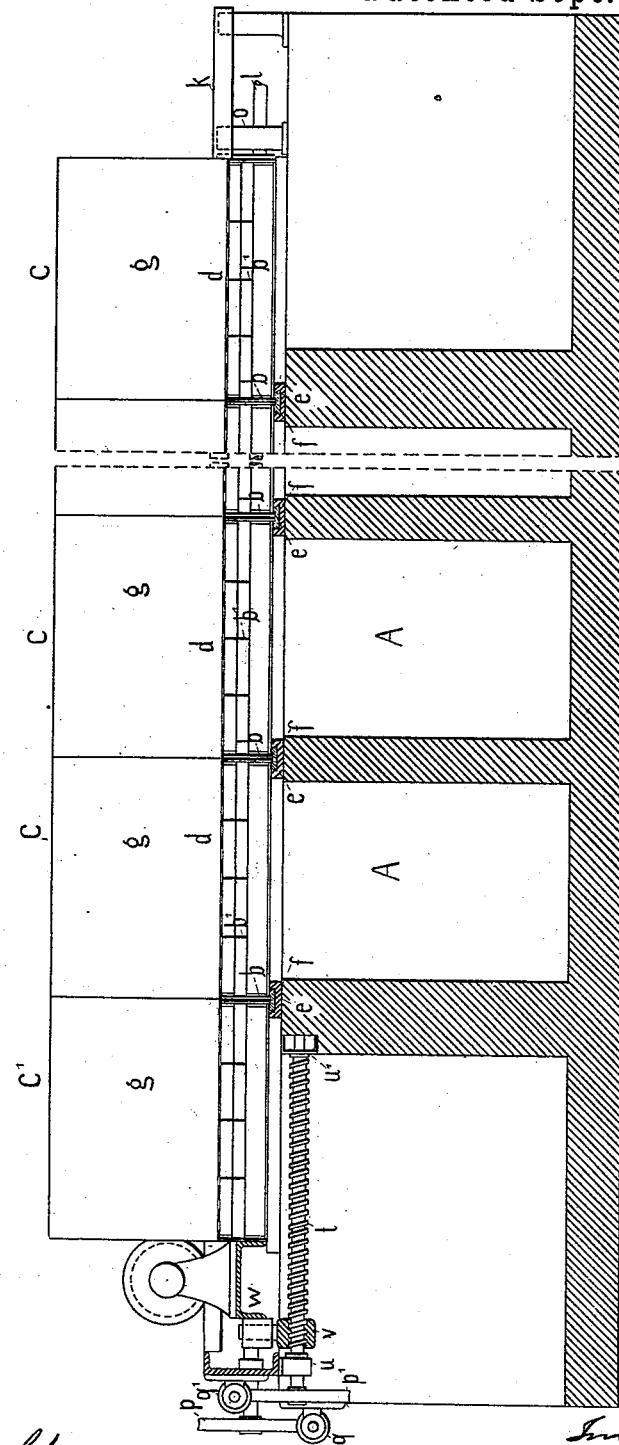

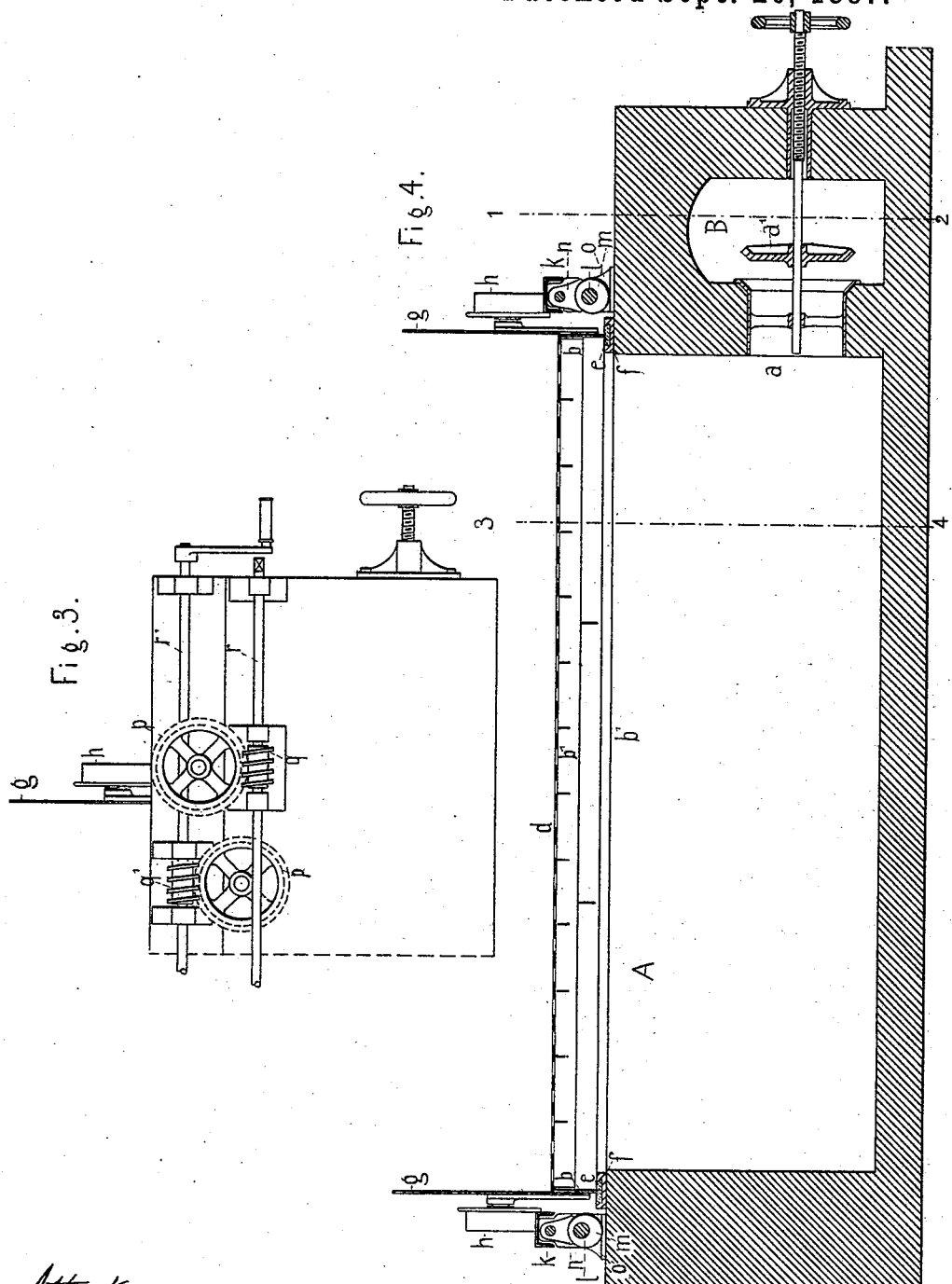

UNITED STATES PATENT OFFICE.

PAUL WEINIG, OF HANAU, PRUSSIA, GERMANY.

MALT-GERMINATING APPARATUS.

SPECIFICATION forming part of Letters Patent No. 370,296, dated September 20, 1887.

Application filed February 1, 1887. Serial No. 226,175. (No model.)

*To all whom it may concern:*

Be it known that I, PAUL WEINIG, a subject of the King of Prussia, and residing at Hanau, Kingdom of Prussia, German Empire, have invented new and useful Improvements in Malt-Germinating Apparatuses, whereof the following is a specification.

My invention relates to apparatuses in which grain, after having been steeped, is left to germinate for the purpose of its conversion into malt; and the improvements consist in the combination, with a movable perforated platform serving to receive the steeped grain and divided into sections, first, of a series of chambers, open at the top, on the walls whereof the sections of the platform rest with their edges so as to cover the chambers, and which communicate separately with an exhauster; secondly, of means for raising the platform and allowing it to be moved so as to fetch the sections thereof forward from one chamber to the other; thirdly, of mechanism for carrying out the operation of moving the platform, and, fourthly, of means for tightening the platform-sections on their seats.

On the annexed three sheets of drawings an apparatus constructed according to my invention is shown by Figure 1, partly in side elevation and partly in longitudinal section, on line 1 2 of Fig. 4, and by Fig. 2 in longitudinal section on line 3 4 of Fig. 3, a portion from the middle being omitted in both figures. Fig. 3 is a portion of the view of the left-hand end, and Fig. 4 a transverse section on line 5 6 of Fig. 1.

The platform is composed of the sections C and one section, C', each section consisting of a perforated plate or a sheet of strong wire fabric, $d$, resting on and fixed with its edges to a grating formed by the frame $b$ and the longitudinal and transverse bars $b'$. At either end each platform-section is provided with an upright wall, $g$, and the sections are so constructed as to close against each other when they are placed in juxtaposition, the walls $g$ of the different sections then forming lateral walls of the whole platform.

A A are the chambers, on the walls of which the platform rests. These chambers are of such size and form that when all the sections C are in their normal position each chamber A will be covered by a section C, standing with its frame $b$ on the walls thereof. The chambers are separately in connection by apertures $a$ with a channel, B, leading to an exhauster—such as a suction-fan (not shown in the drawings)—the said apertures being provided with valves $a'$, fitted with mechanism for opening and closing them, as shown in Fig. 4, and for thus regulating the draft through the perforations or meshes of the different platform-sections produced by the suction apparatus. Preferably the number of chambers is ten.

In order to allow the described platform to be moved, so that the sections C will be transferred from over one chamber to another, each section is provided with two wheels, $h$, and under the said wheels are arranged rails $k$, in combination with mechanism for raising the rails, together with the platform. This mechanism consists in the two shafts $l$, extending lengthwise under the rails $k$ and journaled in bearings $o$, and in the eccentrics $m$, keyed on the shafts $l$ and acting on the rails through the medium of the pieces $n$, straddling the eccentrics. The shafts $l$ are capable of being rotated by means of worm-wheels $p$, fixed to their ends, worms $q$, and shaft $r$. (In Fig. 3 but one of these wheels and one worm are shown.) The rails $k$, made of inverted-U-shaped bars, are guided on upward extensions of the bearings $o$. The eccentrics $m$ and the mechanism for actuating them are so arranged in respect to the other parts that when the eccentrics are turned down the platform-sections will rest on the walls of the chambers A, whereas, when they are rotated by half a revolution, so as to be turned upward, they will raise the rails $k$ and thereby lift off the platform-sections from their seats, so that the platform may then be moved on the rails. Another half-revolution of the eccentrics again lowers the platform.

For shifting the platform after it has been raised, two screws—such as $t$, Fig. 2—are provided for, journaled in fixed bearings $u$ $u'$, and arranged to be simultaneously rotated by means of two worm-wheel gearings, $p'$ $q'$, (only one shown in Fig. 3,) and shaft $r'$, the said screws working in nuts $v$, connected to a transverse bar, $w$, running, like the platform-sections, by means of wheels on the rails $k$, and fixed to or bearing against the platform-section C'. In order to allow the bar w to be raised, together with the platform, the nuts v are arranged to slide vertically in sockets formed on the bar.

For the purpose of preventing air from passing between the edges of the frames b and the upper surface of the walls of the chambers A, strips e, of any suitable packing material—as, for instance, india-rubber—are interposed between the frames and the walls, the said strips being preferably secured to or sunk into recesses of plates f, fixed upon the walls. If the said recesses are made sufficiently large, they may also be filled with water or sand in view of producing a tight joint.

The mode of working with the apparatus is as follows: On starting, the platform-section C, being above the first chamber A—i. e., above the one on the left-hand end of Fig. 2—is charged with steeped grain, and the chamber is put in communication with the exhauster by opening the corresponding valve, a', while the other valves are kept closed. During the time the grain is thus exposed to the current of air passing through the same it is stirred at intervals. This operation may be carried out by means of the malt-turning machine described in the specification of the United States Patent No. 223,086. After a certain time—say twenty-four hours—the loaded platform-section C is raised and moved forward, together with the section C', until the former has been brought over the second chamber A. The section C' is then returned to its original position. Into the space thus produced between the first section, C, and the section, C', another section, C, is inserted, and after the sections have been lowered again it is also charged with steeped grain, and the charge of both sections C is exposed to the ventilating-current and the turning or stirring operation. After further twenty-four hours the third section, C, is inserted and charged, and so on, until all sections and chambers have been taken in use. On the following day the first section, now being on the last chamber A, is emptied and re-inserted at the rear end of the platform. Thereafter the working of the apparatus goes on continuously, one platform-section being emptied, removed to the rear, and reloaded every day.

The object of transferring the platform-sections from over one chamber to the other is to allow them to be loaded while being at one end of the apparatus and to be discharged while being at the other end, whereby convenience in the working of the apparatus is attained. Each chamber A is separately in connection with the exhauster and provided with a regulating-valve, in order that the ventilating-current passing through each portion of malt may be controlled separately, according to the progress of germination and the degree of heat developed by this process in the malt.

I claim as my invention—

1. In a malt-germinating apparatus, the combination, with a perforated platform divided into sections C, of a series of chambers, A, open at the top and communicating with an exhauster, and means for allowing the platform to be moved along the top of the said chambers, substantially as and for the purpose described.

2. The combination, with a perforated platform divided into sections C, provided with wheels h, and the chambers A, of the rails k, and means for raising and lowering them, substantially as and for the purpose specified.

3. The combination, with the perforated platform composed of the sections C, provided with wheels h, and the chambers A, of the rails k, shafts l, with eccentrics m, and means for rotating the said shafts, as hereinbefore described, and for the purpose set forth.

4. The combination, with the perforated platform-sections C and C', provided with wheels h, the chambers A, the rails k, and means for raising and lowering them, of the bar w and screws t, having nuts v, connected to the said bar, as and for the purpose specified.

5. The combination, with the perforated platform-sections C and chambers A, of packing-strips e, or their described equivalents, substantially as and for the purpose set forth.

In testimony whereof I have hereunto set my hand in the presence of two subscribing witnesses.

PAUL WEINIG.

Witnesses:
ALVESTO S. HOGUE,
JEAN GRUND.